May 11, 1948.  F. R. SCHMITT  2,441,513
BREAD PACKAGE
Filed Feb. 12, 1948
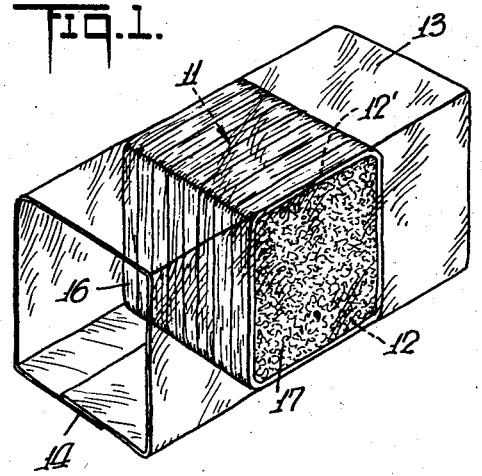
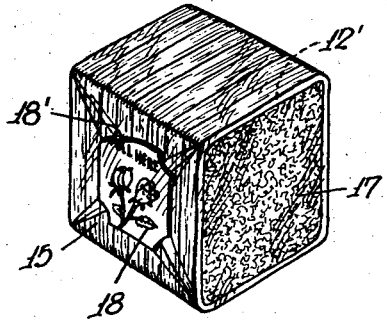
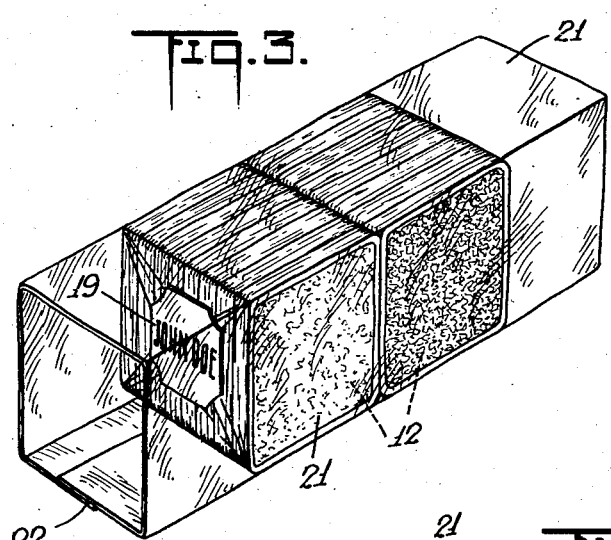
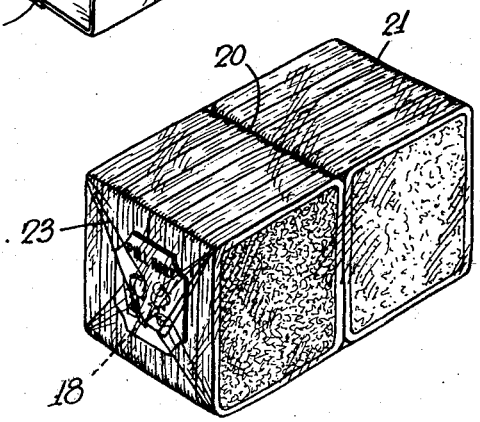
INVENTOR
*Frank R. Schmitt*
BY
*Dean Fairbank & Hirsch*
ATTORNEYS Patented May 11, 1948

2,441,513

UNITED STATES PATENT OFFICE 2,441,513

BREAD PACKAGE

Frank R. Schmitt, Hollis, N. Y., assignor to Carl P. Schmidt, Towson, Md.

Application February 12, 1948, Serial No. 7,922

4 Claims. (Cl. 99—173)

As conducive to a clear understanding of the invention, it is noted that where a stack of bread slices such as pumpernickel laid upon the back of a paper label is enclosed in a wrapper of "Cellophane," the bread is likely to become moldy at that crumb face area which is directly covered and concealed by the label, and the opposite equally vulnerable crumb face area is also subject to contamination, since dust and dirt are not effectively excluded from entry through the open wrapper seam thereat, and moreover such package does not lend itself to the use of automatic wrapping machinery of the type in use by substantially all but the smallest bread baking establishments.

It is among the objects of the present invention to provide a bread package by which all of the foregoing objections are avoided, and which lends itself to packaging of portions of soft varieties of sliced bread, such as white bread, only the crust portion of which offers material resistance to pressure, which package more particularly affords effective protection against contamination at both of the vulnerable crumb faces of the contained sliced bread portion, without detracting from conspicuous exposure to view of the entire area of said crumb faces, so that either of said faces may be displayed as the front of the package, which permits secure application of the identifying label without engagement thereof with the bread or of pressure against the yielding soft crumb portion thereof, which is adapted to packaging by conventional automatic wrapping machinery for mechanical security of enclosure, without likelihood of unintended opening or rupture of the wrapper and yet is readily opened when access is to be had to the bread for consumption.

Another object is to provide a bread package by which the label or labels, though out of contact with the bread, are themselves adequately protected, and by which access may be had to one portion of bread slices while still affording wrapper protection to another portion of such slices for convenience and economy where one package of bread is to serve for two or more days.

According to the invention, a portion of bread generally of rectangular parallelepiped, illustratively of cubical form, with the crumb interior exposed desirably at both end faces thereof and preferably consisting of a stack of upright slices, is positioned upon a transparent wrapper, such as a film of "Cellophane" or "Pliofilm," so that the crumb faces of the bread portion extend longitudinally of the wrapped package or at right angles to the end folds which lie against the crust sides of the portion of bread, and a single ply uninterrupted wrapper area covers each crumb face of the bread portion.

The package is preferably equipped with labels adhering to the folded ends of the package to hold these folds together and an edge of one of said labels is left free as a pull tab for facility in opening the package.

In a preferred embodiment, two or more portions or stacks of the same or of diverse varieties of sliced bread, and exposing the crumb interior thereof at the opposite faces and individually wrapped as above set forth are juxtaposed with a wrapper-covered crust side of one portion in contact with a wrapper-covered crust side of a second portion, and with the crumb faces of said portions aligned, an outer transparent wrapper enclosing the wrapped individual packages, and having its multi-ply folds against those wrapper covered crust sides of the individual portions which are at the ends of the complete package. Uninterrupted single ply portions of the outer wrapper cover the combined areas of the respective aligned wrapper covered crumb faces of the inner packages.

The term "single ply" as used in certain of the claims, defines the structure of the wrapper regardless of the number of films or layers of which it may be composed. Only where parts of the sheet are overlapped over the bread does the package wrapper have more than one ply within the meaning of the term "ply" as used in the claims.

The present application is a continuation-in-part of my copending application Serial No. 782,-483, filed October 28, 1947, now abandoned, which in turn is a continuation-in-part of my earlier appplication Serial No. 670,100, filed May 16, 1946.

In the accompanying drawings in which are shown one or more of various possible embodiments of the several features of the invention, Fig. 1 is a perspective view of a sliced portion of bread with the wrapper sheet encompassing the same but prior to forming the end folds, Fig. 2 is a perspective view of the individual bread package of the present invention, Fig. 3 is a perspective view of a pair of the individual packages with the outer wrapper thereabout but prior to forming its end folds, and Fig. 4 is a perspective view of the complete package with that end exposed to view which is concealed in Fig. 3.

Referring now to the drawings, a substantially parallelepiped, illustratively a cubical portion 11 of sliced bread and exposing the crumb portion of faces 12 of the bread at opposite ends of the portion, is enclosed in a rectangular transparent wrapper 13, desirably a film of "Cellophane," "Pliofilm" or the like, which is first passed about the bread portion, as shown in Fig. 1, with the seam or overlap under the bread portion at 14 and in such direction that the series or stack of slices extends transversely as shown, rather than longitudinally of the wrapper, and the area of each slice extending longitudinally of the wrapper tube encompassing the bread, as shown in Fig. 1. In other words, the axis of the bread slices extends transversely, rather than longitudinally of said wrapper tube. The protruding ends of the wrapper tube of Fig. 1 are then folded inward with the multi-ply folds 15 thus formed against the respective crust sides 16 of the bread the entire length of the seam 14 thus extending along the crust of the bread and parallel to the bread slices, while uninterrupted single-ply areas 17 of the wrapper directly cover the entire areas of the respective crumb end faces 12 from each crust edge 12' to the opposite crust edge of said end face, thereby exposing to view the entire areas of said crumb end faces, as shown in Fig. 2.

The pressure of the wrapper when tightly fitted to the bread portion is thus exerted against the pressure resistant crust portion, and the crust edges 12' of the crumb end faces of the slices in juxtaposition to the uninterrupted single-ply area 17 of the wrapper, as shown in Fig. 2, act as a frame and tend to stretch the uninterrupted ply 17 to lie against the crumb face which it covers without any open seam through which contamination of the vulnerable crumb face could occur and without compressing said soft crumb face, and to afford a clear view of said crumb face in normal uncompacted condition and unobstructed by ripples or creases in the wrapper which might result if it were to fit too loosely.

In a preferred embodiment, each end fold 15 is sealed by an appropriate label 18 at one end and 19 at the other, bearing the identity of the baker and other information. Desirably the entire periphery of each of these labels lies against the corresponding crust side of the bread and the label is attached to the end folds of the wrapper by thermoplastic cement, the crust portion of the bread which backs the labels being amply resistant to withstand the pressure of the label applying implement. Desirably the upper edge of one of the labels is not adhesively bonded to the wrapper and affords a finger grip or pull tab 18' by which the wrapper may be readily stripped from the bread when the package is opened.

Thus the entire surface area of the portion of sliced bread, including the front and rear crumb faces 12, the top and bottom as well as the sides 16 are directly engaged by the protective wrapper or film without the objectionable contact of a paper label with the bread that tends to promote the formation of mold.

The individual package as shown in Fig. 2, completely exposing to view the entire crumb face of each of the extreme slices, the slice at either end of the portion may be displayed as the front of the bread package. Thus the packages may be conveniently arranged by the grocer or baker for display on a stand or counter. Such display, in addition to being attractive and thus greatly enhancing the saleability of the bread, by affording a clear view of the entire crumb face thereof, dispenses with the need for removing the bread from the counter or shelf to ascertain its texture and type. Thus excessive handling of the bread with resultant injury to the wrapper is avoided.

While the individual package as shown in Fig. 2 is itself an article of manufacture within the scope of the present invention, an important embodiment of the invention involves two or more of the individual packages of Fig. 2 in a composite package such as shown in Fig. 4. To this end two or more individual packages are juxtaposed in side by side relation with their wrapper covered crust side portions 20 in direct engagement as shown, and with end crumb faces 12 of the contiguous portions aligned in a common plane and the labels 18, 19 exposed at the ends of the longer double portion of bread. The aligned individual packages are wrapped in outer wrapper 21 which is folded around the juxtaposed wrapped packages, as shown in Fig. 3, with the seam 22 or overlap under said individual packages, so that the slices extend longitudinally of the wrapper tube thus formed thereabout in the first step of applying the outer wrapper. Thereupon the outer wrapper is end-folded as at 23 over the labels at the ends of the double portion of packaged bread and sealed in conventional manner to complete the package. Thus the labels at the ends of the inner packages are exposed to view through the end folds 23 of the outer wrapper 21, which end folds also protect said labels 18, 19 at opposite ends of the composite package and particularly the loose tear tab 18' from becoming scuffed or injured in handling.

The composite package in the preferred embodiment shown in Fig. 4, contains a quantity of sliced bread equal to that of the conventional bread loaf. In the composite package, the bread of the individual packages therein may be of different varieties. Thus one individual package might contain white bread and the other rye bread, so that in a household consuming but little bread it is possible to afford desired variety without the waste of partly using only portions of loaves of each type of bread. Moreover, if only one individual package is to be consumed at one sitting, the remaining fully wrapped individual package may be kept intact and without exposure, for consumption the day after.

It is within the scope of the invention to enclose unwrapped one of the two individual portions in the composite package of Fig. 4, the other portion being wrapped in the manner shown in Fig. 2. Where the portions are of the same type of bread, it is clear that upon opening the outer wrapper 21, access is thus had to the unwrapped portion while the companion portion remains wrapped and protected for later use.

It will be seen that the package of the present invention dispenses with the need for a boat or tray of cardboard to support the several portions of sliced bread, thereby effecting economy in cost and obviating the likelihood of contamination from the pulp of such cardboard.

It will of course be understood that the term "bread" is intended to cover any bakery product prepared in the general rectangular shape of bread.

Changes could be made in the package above described and different embodiments of this invention could be made without departing from the scope of the claims. It is intended that all matter contained in the above description or shown in the accompanying drawing shall be interpreted as illustrative and not in a limiting sense except to the extent that such limitations are imposed by the appended claims.

Having thus described my invention, what I claim as new and desire to secure by Letters Patent of the United States is:

1. As an article of manufacture, a bread package having a transparent wrapper containing a portion of sliced bread comprising a single stack of bread slices positioned with the yielding soft crumb face at each end thereof extending longitudinally of the wrapper, said wrapper having the entire length of its seam along the pressure resistant crust of the stack and parallel to the bread slices, said wrapper engaging the entire crust top and bottom of the bread portion, having the multi-ply end folds thereof against the respective crust sides of the bread and having uninterrupted single-ply areas extending against and covering the entire crumb end faces from each crust edge to the opposite crust edge of said end faces, with said entire crumb faces exposed to view through said single-ply areas.

2. The wrapper recited in claim 1, in which labels are adhesively attached to the exterior of the end folds, the entire periphery of one of said labels lying against the corresponding crust side of the bread and having an unattached edge to serve as a pull tab for opening the wrapper.

3. As an article of manufacture, a bread package having a transparent outer wrapper, said wrapper enclosing a plurality of portions of sliced bread, said portions being of substantially the same size and shape, each portion having the crumb end faces thereof exposed to view, each of said portions being separately wrapped, said individual wrappers each directly engaging the entire surface area of its enclosed portion and having the multi-ply folds thereof against the respective crust sides of the bread and continuous single-ply portions extending directly against the entire areas of the respective crumb end faces from each crust edge to the opposite crust edge of said end faces, said bread portions being arranged with their crumb faces in side-by-side relation longitudinally of the outer wrapper, said outer wrapper engaging the entire exposed surface of the contents consisting of the juxtaposed wrapped portions and having its folds against those crust sides of the individually wrapped portions which are at the ends of the composite package, continuous single-ply portions of said outer wrapper covering the entire areas of the respective sides of said contents, which said sides constitute the aligned crumb end faces of the individual wrapped portions of bread.

4. As an article of manufacture, a bread package having a transparent outer wrapper, said wrapper containing two portions of bread of substantially the same size and shape, each having the crumb portion thereof exposed to view at at least one end face thereof, one of said portions in said outer wrapper having a separate wrapper directly engaging the entire surface area of said portion, said separate wrapper having the folds thereof against the respective crust sides of the portion enclosed thereby, and a continuous single-ply portion extending directly against the entire area of the corresponding crumb end face from each crust edge to the opposite crust edge of said end face, said portions being arranged in juxtaposition at crust sides with their crumb faces in side-by-side relation longitudinally of the outer wrapper, said outer wrapper engaging the entire exposed surface of the contents consisting of the juxtaposed portions including the separately wrapped portion, with the multi-ply folds of said outer wrapper against those crust sides of the bread which are at the ends of the complete package, uninterrupted single-ply portions of said outer wrapper covering the entire areas of the respective sides of said contents, at least one of which sides constitutes the aligned crumb end faces of the individual portions of bread.

FRANK R. SCHMITT.

REFERENCES CITED

The following references are of record in the file of this patent:

UNITED STATES PATENTS

| Number | Name | Date |
| --- | --- | --- |
| D. 99,326 | Hauswald | Apr. 4, 1936 |
| 1,969,004 | Hartman | Aug. 7, 1934 |
| 2,327,024 | Davidson, Jr., et al | Aug. 17, 1943 |
| 2,332,316 | Hexter et al. | Oct. 19, 1943 |

OTHER REFERENCES

A package of "Sliced Munzenmaier's Kommissbrot Rye Bread."